(12) United States Patent
Anders

(10) Patent No.: US 10,385,671 B2
(45) Date of Patent: Aug. 20, 2019

(54) APPARATUS, SYSTEMS, AND METHODS FOR FRACTURING A GEOLOGICAL FORMATION

(71) Applicant: The Anders Family Living Trust, Sun City West, AZ (US)

(72) Inventor: Edward O. Anders, Kerrville, TX (US)

(73) Assignee: The Anders Family Living Trust, Sun City West, AZ (US)

( * ) Notice: Subject to any disclaimer, the term of this patent is extended or adjusted under 35 U.S.C. 154(b) by 0 days.

(21) Appl. No.: 16/136,014

(22) Filed: Sep. 19, 2018

(65) Prior Publication Data

US 2019/0017363 A1     Jan. 17, 2019

Related U.S. Application Data

(62) Division of application No. 15/175,816, filed on Jun. 7, 2016, now Pat. No. 10,107,083, which is a division (Continued)

(51) Int. Cl.

| | |
|---|---|
| *E21B 43/26* | (2006.01) |
| *E21B 34/14* | (2006.01) |
| *E21B 33/12* | (2006.01) |
| *E21B 34/10* | (2006.01) |
| *E21B 34/12* | (2006.01) |
| *E21B 43/16* | (2006.01) |

(Continued)

(52) U.S. Cl.
CPC .............. *E21B 43/26* (2013.01); *E21B 33/12* (2013.01); *E21B 33/128* (2013.01); *E21B 34/06* (2013.01); *E21B 34/10* (2013.01); *E21B 34/12* (2013.01); *E21B 34/14* (2013.01); *E21B 43/164* (2013.01); *E21B 43/267* (2013.01); *E21B 2034/007* (2013.01); *Y02P 90/70* (2015.11)

(58) Field of Classification Search
CPC ...... E21B 43/162; E21B 43/26; E21B 34/102; E21B 34/12; E21B 34/14; E21B 33/126
See application file for complete search history.

(56) References Cited

U.S. PATENT DOCUMENTS

| | | | |
|---|---|---|---|
| 1,802,525 A | * | 4/1931 | Newlin .................. E21B 37/08 166/147 |
| 2,753,940 A | | 7/1956 | Bonner |

(Continued)

OTHER PUBLICATIONS

International Search Report and Written Opinion of the International Searching Authority for co-pending PCT application No. PCT/US2015/027673 dated Jul. 28, 2015.

(Continued)

*Primary Examiner* — Kenneth L Thompson
(74) *Attorney, Agent, or Firm* — Seyfarth Shaw LLP

(57) ABSTRACT

The present disclosure relates, according to some embodiments, to apparatus, systems, and methods of fracturing a geological structure including the application of kinetic energy (e.g., from high velocity frack fluid) to a subterranean structure. In some embodiments, the present disclosure relates to apparatus, systems, and methods for delivery of high velocity fluid to a well using a down hole valve and/or throttling system. The present disclosure relates to apparatus, systems, and methods of generating pressure using accumulators (e.g., high pressure accumulators) at the surface of a well.

6 Claims, 8 Drawing Sheets

Related U.S. Application Data of application No. 14/696,357, filed on Apr. 24, 2015, now Pat. No. 9,394,778.

(60) Provisional application No. 61/983,836, filed on Apr. 24, 2014.

(51) Int. Cl.
*E21B 43/267* (2006.01)
*E21B 33/128* (2006.01)
*E21B 34/06* (2006.01)
*E21B 34/00* (2006.01)

(56) References Cited

U.S. PATENT DOCUMENTS

| | | | |
|---|---|---|---|
| 3,050,132 A * | 8/1962 | Page | E21B 34/08 137/460 |
| 4,749,044 A | 6/1988 | Skipper | |
| 5,396,956 A * | 3/1995 | Cherewyk | E21B 17/1007 166/191 |
| 6,263,969 B1 | 7/2001 | Stoesz | |
| 7,735,568 B2 * | 6/2010 | Xu | E21B 33/1216 166/187 |
| 7,748,459 B2 | 7/2010 | Johnson | |
| 9,394,778 B2 * | 7/2016 | Anders | E21B 33/12 |
| 10,107,083 B2 * | 10/2018 | Anders | E21B 33/12 |
| 2006/0027368 A1 | 2/2006 | Manke et al. | |
| 2011/0108272 A1 | 5/2011 | Watson | |
| 2012/0037373 A1 | 2/2012 | Xu | |
| 2013/0056220 A1 | 3/2013 | Sommers et al. | |
| 2014/0000899 A1 | 1/2014 | Nevison | |
| 2014/0060831 A1 | 3/2014 | Miller | |

OTHER PUBLICATIONS

International Report on Patentability of the International Searching Authority for co-pending PCT application No. PCT/US2015/027673 dated Oct. 25, 2016.

\* cited by examiner

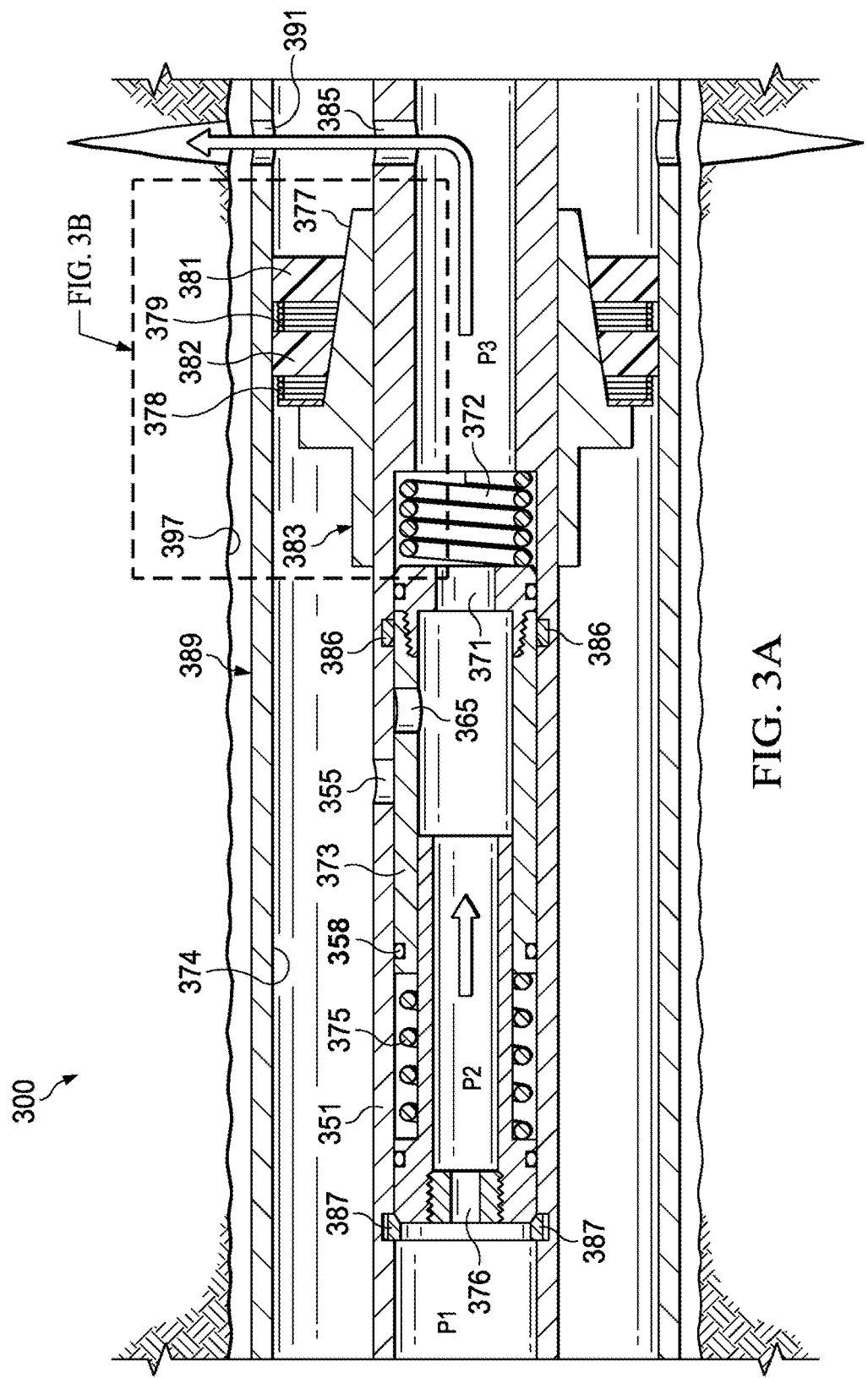

APPARATUS, SYSTEMS, AND METHODS FOR FRACTURING A GEOLOGICAL FORMATION

CROSS-REFERENCE TO RELATED APPLICATIONS

This application is a divisional of U.S. patent application Ser. No. 15/175,816, filed Jun. 7, 2016, now U.S. Pat. No. 10,107,083, which application is a divisional of U.S. patent application Ser. No. 14/696,357 filed Apr. 24, 2015, now U.S. Pat. No. 9,394,778, which application claims benefit of provisional U.S. patent application Ser. No. 61/983,836, filed Apr. 24, 2014, all of the contents of which are hereby incorporated in their entirety by reference.

FIELD OF THE DISCLOSURE

The present disclosure relates, in some embodiments, to apparatus, system, and methods of fracturing a geological structure.

BACKGROUND OF THE DISCLOSURE

Wells for the production of natural gas and other products may include a well bore to a depth of 8,000 to 12,000 feet below the surface and may be generally vertical with optional horizontal zones. Well production may be initiated or reinitiated by introducing cracks or fractures in the subterranean formation. Even though natural resources may remain in a formation, production can cease when efforts to introduce further fractures in the subterranean formations are unsuccessful.

SUMMARY

Accordingly, a need has arisen for improved apparatus, systems, and methods for inducing failure (e.g., fracturing) a subterranean formation. The present disclosure relates, according to some embodiments, to apparatus, system, and methods of fracturing a geological structure including the application of kinetic energy (e.g., from high velocity frack fluid) to a subterranean structure. For example, a method of kinetically fracking a subterranean structure may comprise (a) providing a fracking string inside a perforated wellbore liner having an interior cavity, the fracking string having an interior channel and spaced-apart apertures connecting the interior string channel and the liner cavity, (b) accelerating a fracking fluid in the interior channel in a downhole direction to a velocity of from about 50 to about 100 feet per second, and/or (c) abruptly decelerating fracking fluid flow. In some embodiments, a method may further comprise repeating steps (b) and (c) (e.g., in sequence). Abruptly decelerating fracking fluid flow may further comprise closing the string apertures, sealing the interior liner cavity or combinations thereof, according to some embodiments. Accelerating a fracking fluid in the interior channel in a downhole direction may further comprise, in some embodiments, injecting the fracking fluid at a pressure of about 8,000 psi to about 15,000 psi into the interior channel. A pressure of 15,000 psi is required for an overburdened pressure zone. In some embodiments, accelerating a fracking fluid in the interior channel in a downhole direction may further comprise (a) providing the fracking fluid at a pressure of about 8,000 psi to about 15,000 psi, wherein the fracking fluid is substantially free of proppant, (b) adding at least one proppant to the fracking fluid, and/or (c) injecting the fracking fluid with proppant into the interior channel. In some embodiments, accelerating a fracking fluid in an interior channel in a downhole direction may further comprise injecting a gas into the interior channel at a pressure of about 8,000 psi to about 10,000 psi. An injected gas may be or may comprise carbon dioxide, nitrogen, methane, or combinations thereof. In some embodiments, a fracking fluid may comprise up to about 30% (V/V) gas and at least about 70% (V/V) fluid (e.g., liquid). Abruptly decelerating the fracking fluid flow may further comprise delivering to the subterranean structure a kinetic energy pulse of finite duration of more than about 12,000,000 foot-pounds, according to some embodiments. Abruptly decelerating fracking fluid flow may further comprise, in some embodiments, delivering to the subterranean structure a kinetic energy pulse of finite duration (e.g., ≤~2 seconds, ≤~1 seconds, ≤~0.5 seconds, ≤~0.1 seconds) of about 2,000,000 ft lbs to about 11,000,000 ft lbs (at ~4000 gpm and ~8000 psi) in a well about ~12,000 foot deep.

The present disclosure also relates, in some embodiments, to systems for kinetically fracking a subterranean structure. A system for kinetically fracking a subterranean structure may comprise, for example, (a) a well in fluid communication with the subterranean structure, (b) a well liner inside the well, (c) a fracking string inside the well liner, the fracking string comprising a central channel, (d) a high pressure gas accumulator in fluid communication with the central channel of the fracking string and configured to accelerate a fracking fluid downhole, (e) a high pressure gas fluid accumulator in fluid communication with the central channel of the fracking string and configured to accelerate the fracking fluid downhole, (f) a high pressure gas pump operably linked to the with the high pressure gas accumulator and the high pressure gas fluid accumulator, and/or (g) a fluid velocity activated annular valve configured to abruptly decelerate the fracking fluid. In some embodiments, a system may further comprise from one to about twenty additional high pressure gas pumps and/or fluid accumulator backed up fluid pumps, each independently configured to deliver, for example, about 1500 to about 2000 horsepower.

According to some embodiments, the present disclosure relates to a downhole fluid velocity-activated annular valve. A velocity-activated annular valve may be configured for operation in a wellbore with an inserted production liner, in some embodiments. A velocity-activated annular valve may comprise, for example, (a) an annular body having a longitudinal axis, an interior surface configured to slide along and seal a fracking string, and an exterior surface comprising a taper, the taper extending circumferentially around the exterior surface and extending along at least a portion of the length of the body, (b) an annular packing element contacting and surrounding the taper and configured to translate radially outwardly upon axial movement of the ramp, and/or (c) at least one aperture configured to align with a corresponding hole in the fracking string and support fluid communication between the inner channel of the fracking string and the liner cavity. In some embodiments, an annular valve may further comprise an annular housing surrounding an annular spring, the spring configured for compression and decompression with axial movement of the valve. A maximum extent of a taper may be positioned at the more downhole end of an annular valve and/or a minimum extent of a taper may be positioned at the end of a valve nearer to the well head, in some embodiments. An annular valve may further comprise, according to some embodiments, an O-ring on the inner surface configured to sealably contact the fracking string.

According to some embodiments, the present disclosure relates to systems for directing fluid in a subterranean structure. A system may comprise, for example, (a) a well in fluid communication with the subterranean structure, (b) a well liner inside the well, (c) a fracking string inside the well liner, the fracking string comprising a central channel for carrying the fluid, (d) a configurable slider sleeve for directing flow of the fluid, (e) a first orifice located near the slider sleeve, a pressure drop across the first orifice being determined by the flow of the fluid, and (f) an expandable first spring for moving the slider sleeve when the pressure drop across the first orifice falls to or below a threshold level, the movement of the slider sleeve enabling the fluid to enter an annular space between the fracking string and the well liner. In some embodiments, a system may further comprise a second spring, the second spring being compressed upon the movement of the slider sleeve enabling the fluid to enter the annular space between the fracking string and the well liner. In some embodiments, a system may further comprise a first snap ring for compressing or expanding the first spring, and a second snap ring for compressing or expanding the second spring. The first snap ring or the second snap ring is engagable with the slider sleeve. In some embodiments, a valve mandrel associated with a system as described herein is not movable, and a valve associated with the system is movable. In some embodiments, both the valve mandrel and the valve associated with the system are movable.

BRIEF DESCRIPTION OF THE DRAWINGS

Some embodiments of the disclosure may be understood by referring, in part, to the present disclosure and the accompanying drawings, wherein:

FIG. 3A illustrates a fracking system in a first position according to a specific example embodiment of the disclosure;

Figure 1:
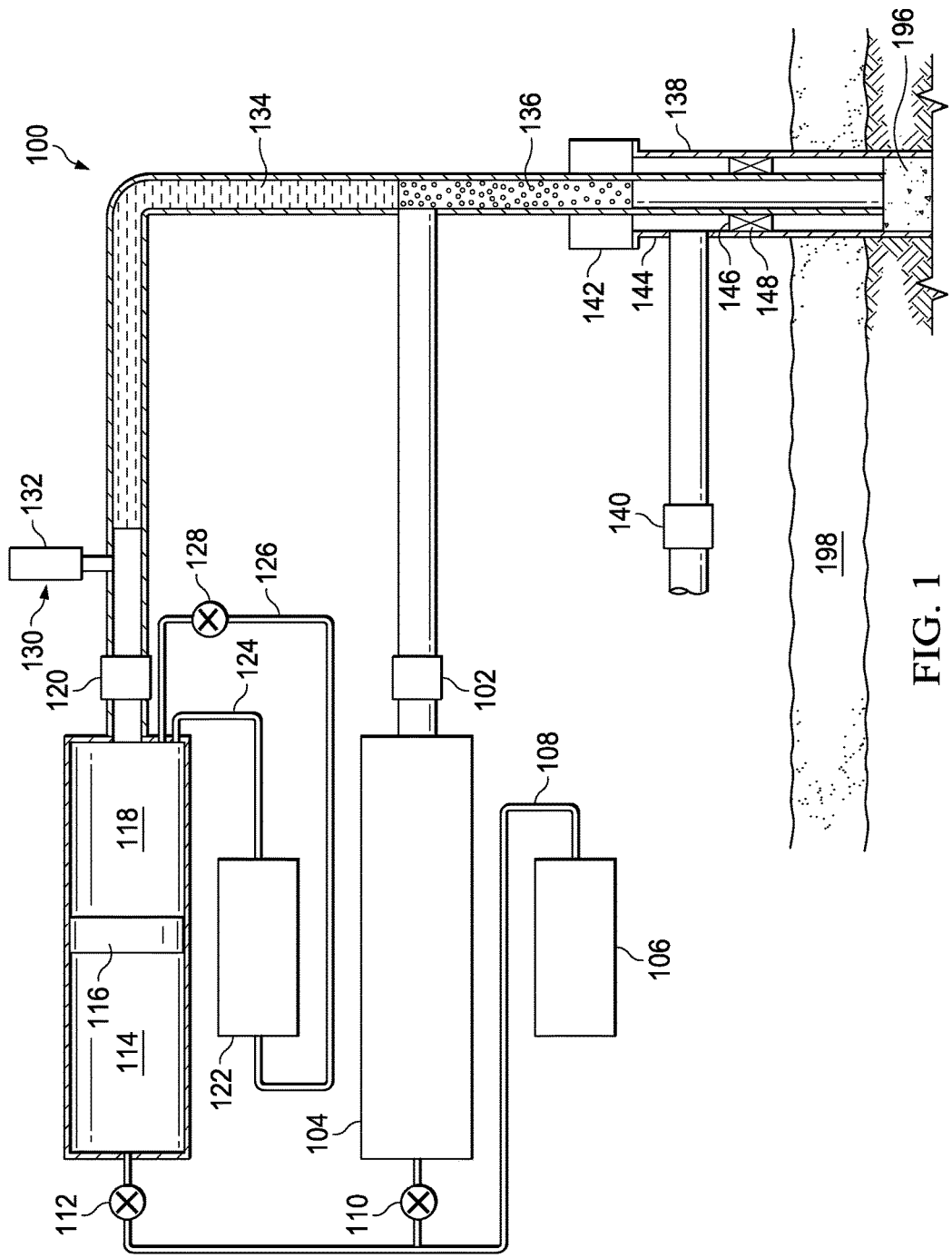
FIG. 1 illustrates a fracking system according to a specific example embodiment of the disclosure.

Table 1 below includes the reference numerals used in this application. The thousands and hundreds digits correspond to the figure in which the item appears while the tens and ones digits correspond to the particular item indicated. Similar structures share matching tens and ones digits.

TABLE 1

Figure 2A:
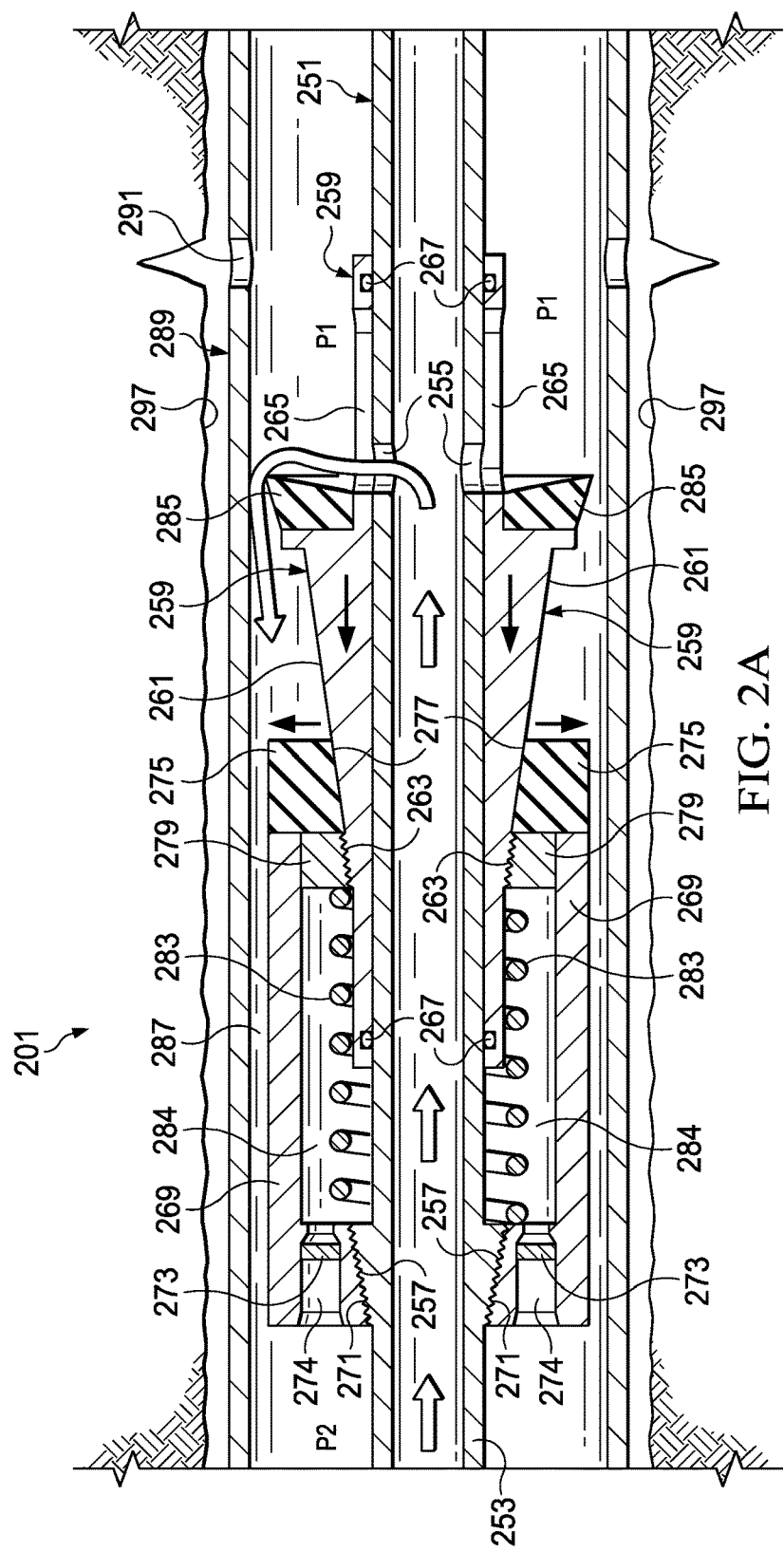
FIG. 2A illustrates a section view of a fracking system having a fluid velocity activated annulus valve in an open position according to a specific example embodiment of the disclosure.
Figure 2B:
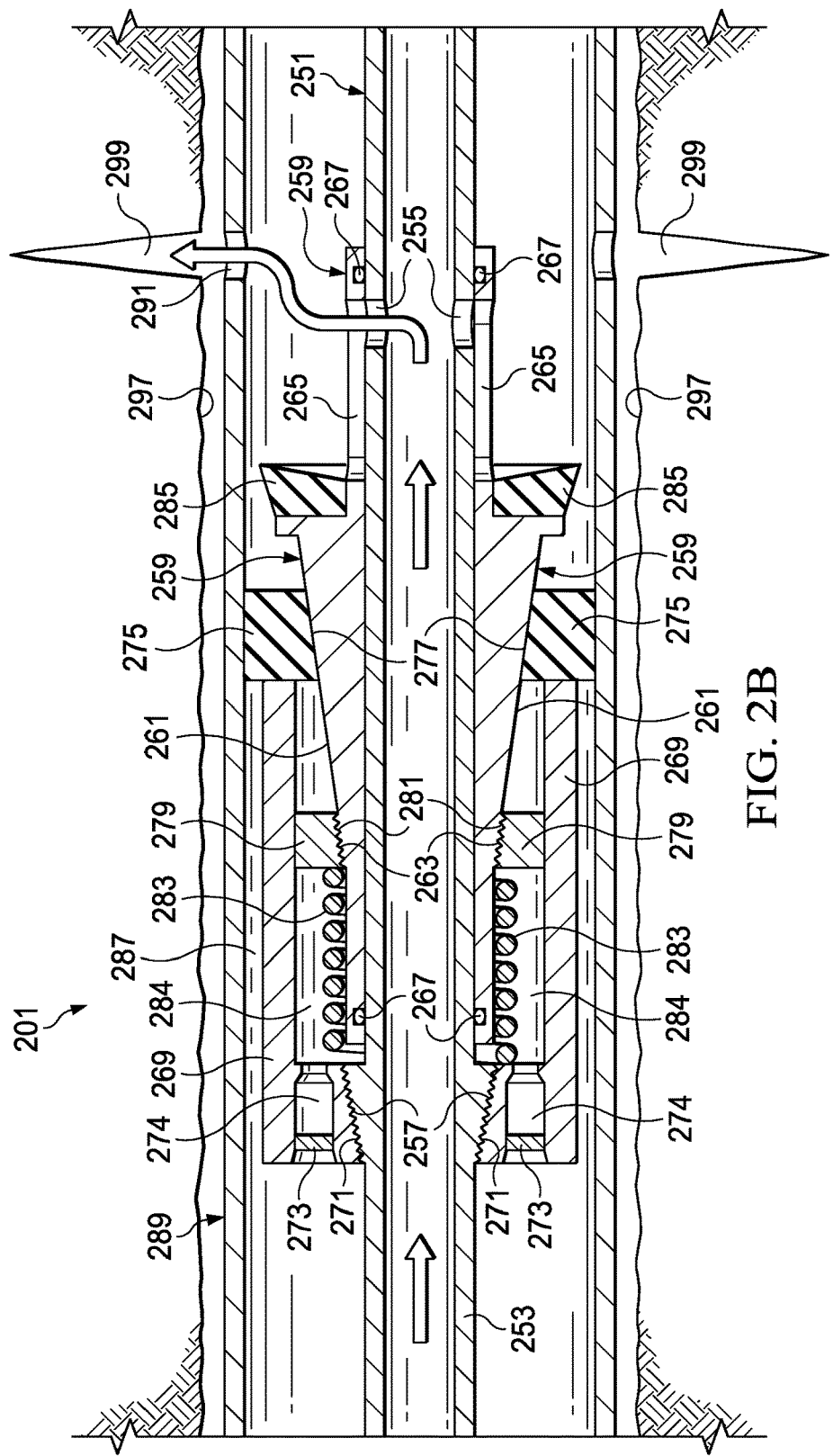
FIG. 2B illustrates a section view of a fracking system having a fluid velocity activated annulus valve in a closed position according to a specific example embodiment of the disclosure.
Figure 2C:
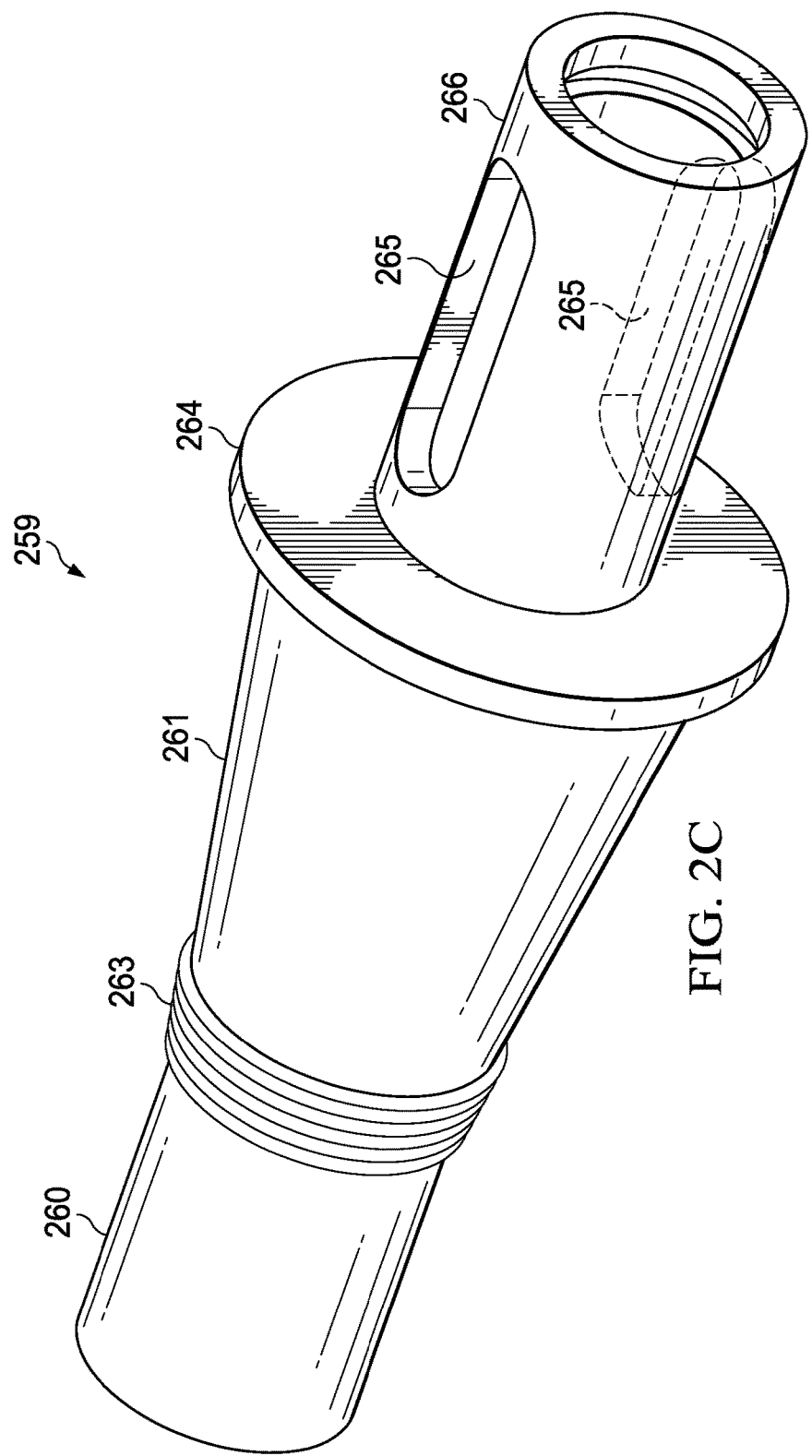
FIG. 2C illustrates a perspective view of the annular velocity valve shown in FIGS. 2A and 2B.
Figure 3B:
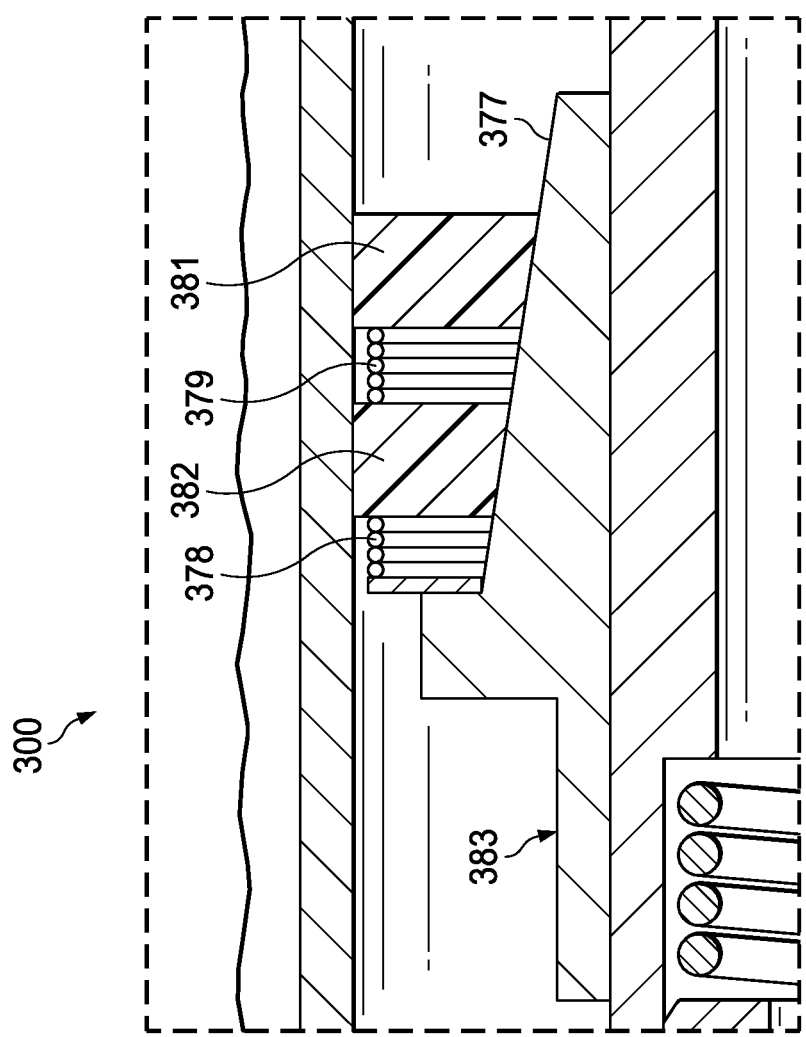
FIG. 3B illustrates an enlarged view of a portion of the fracking system illustrated in FIG. 3A.
Figure 3C:
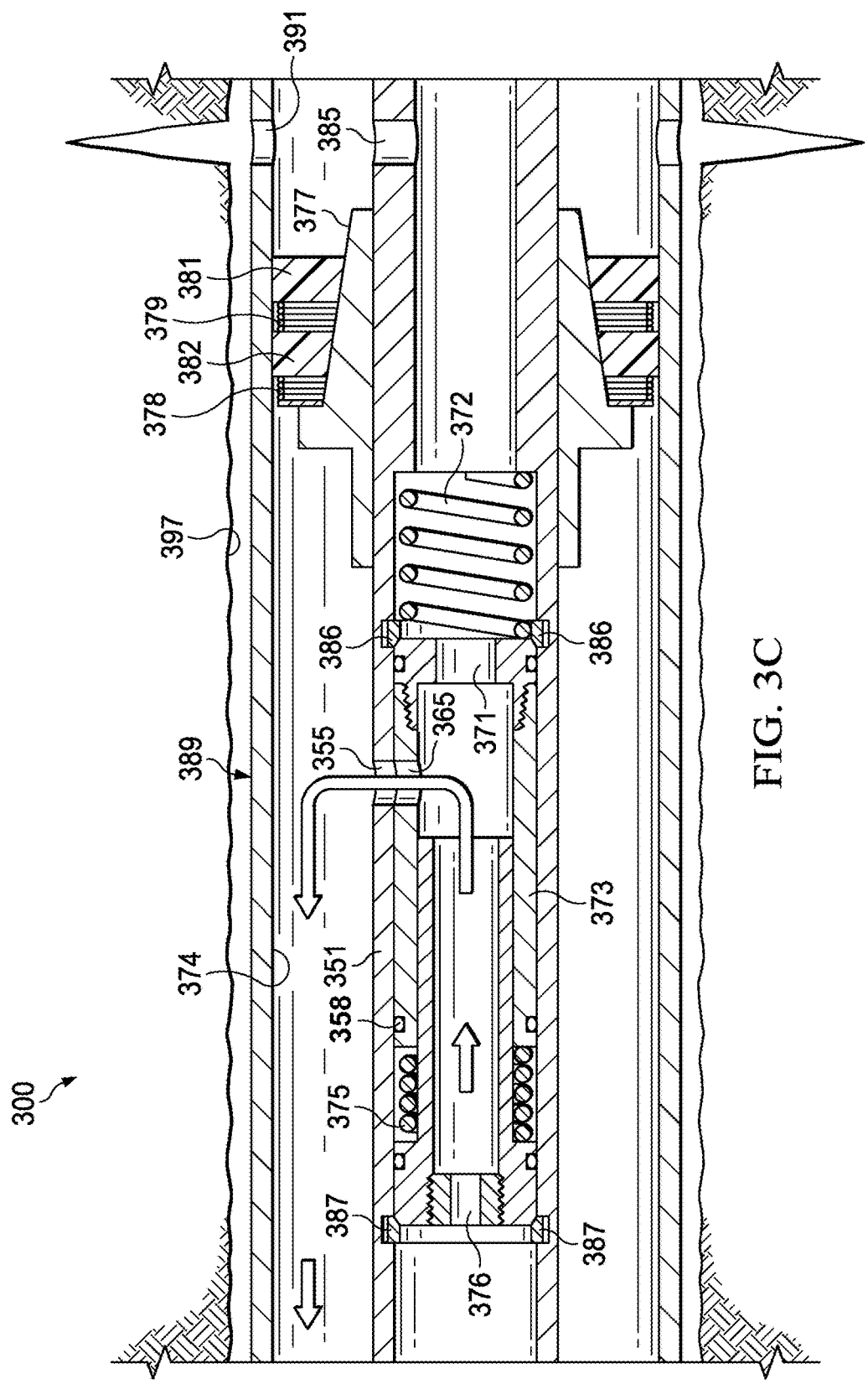
FIG. 3C illustrates a fracking system in a second position according to a specific example embodiment of the disclosure.
Figure 4:
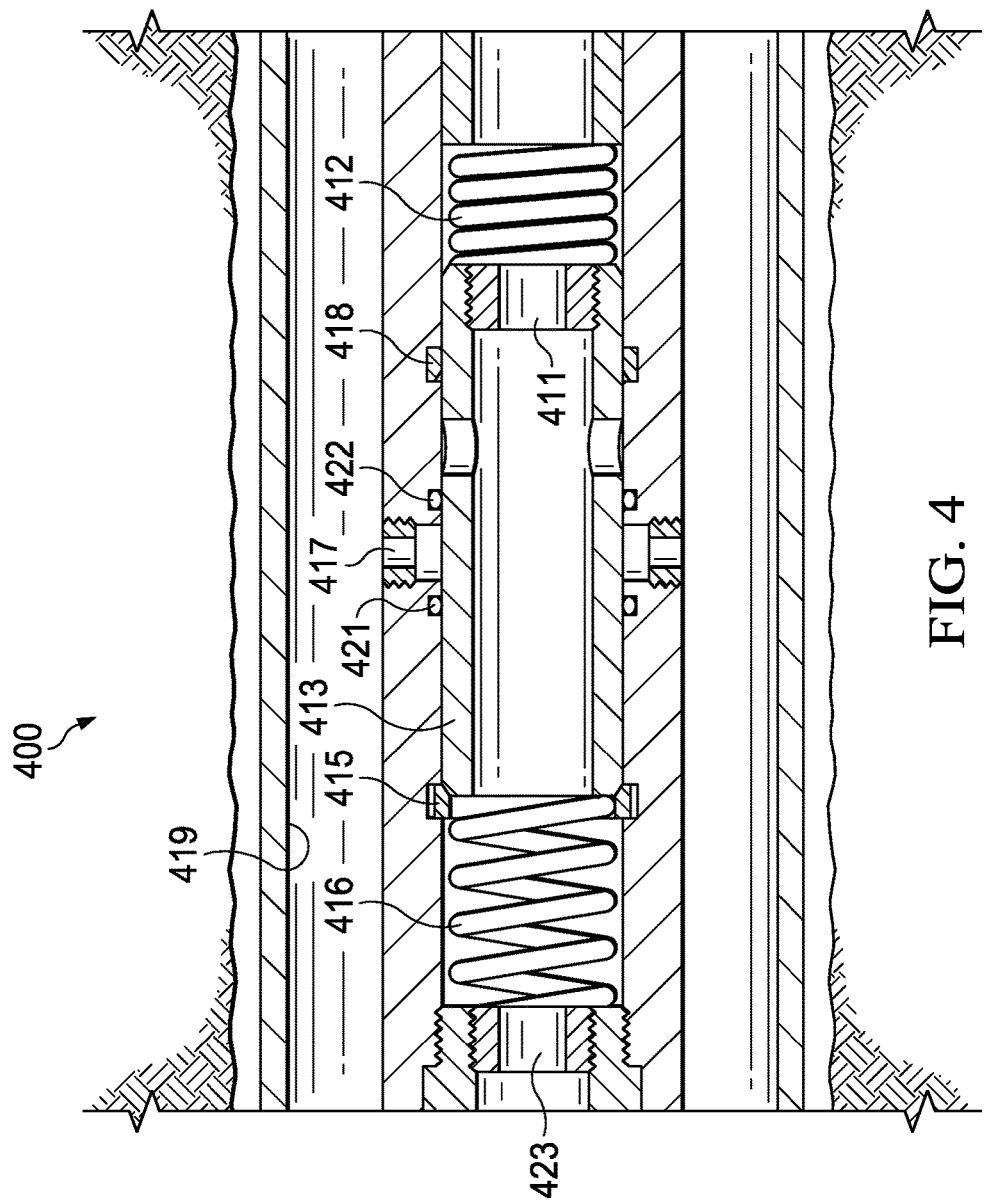
FIG. 4 illustrates a fracking system according to a specific example embodiment of the disclosure.

|  | FIG. 1 | FIG. 2 | FIGS. 3A, 3B, and 3C | FIG. 4 |
|---|---|---|---|---|
| System | 100 |  | 300 | 400 |
| System |  | 201 |  |  |

TABLE 1-continued

|  | FIG. 1 | FIG. 2 | FIGS. 3A, 3B, and 3C | FIG. 4 |
|---|---|---|---|---|
| Programed Gas Throttling Valve | 102 |  |  |  |
| High Pressure Gas Accumulator | 104 |  |  |  |
| High Pressure Gas Compressor | 106 |  |  |  |
| High Pressure Gas Supply Line | 108 |  |  |  |
| High Pressure Gas Input Valve | 110 |  |  |  |
| High Pressure Gas Inlet Valve | 112 |  |  |  |
| Gas Side High Pressure Gas Accumulator | 114 |  |  |  |
| Piston | 116 |  |  |  |
| Fluid Side | 118 |  |  |  |
| Programmed Throttling Valve | 120 |  |  |  |
| High Pressure Frack Pump | 122 |  |  |  |
| Fluid Accumulator Make Up Line | 124 |  |  |  |
| Pump Bypass Line Back To Suction | 126 |  |  |  |
| Program Controlled Fluid Bypass Valve | 128 |  |  |  |
| Dopant Dispenser | 130 |  |  |  |
| Program Controlled Metering Valve | 132 |  |  |  |
| Frack Fluid Containing Proppants | 134 |  |  |  |
| Gas | 136 |  |  |  |
| Production Liner | 138 |  |  |  |
| Annulus Program Controlled Valve | 140 |  |  |  |
| Well Head | 142 |  |  |  |
| Production String | 144 |  |  |  |
| Fluid Velocity Activated Annulus Valve | 146 |  |  |  |
| Pressure Activated Packer | 148 |  |  |  |
| Interior Channel |  |  | 251 |  |
| Interior Channel Wall |  |  | 253 |  |
| Aperture |  |  | 255 |  |
| Threaded Flange |  |  | 257 |  |
| Annular Valve |  |  | 259 |  |
| Ramp |  |  | 261 |  |
| Threaded Zone |  |  | 263 |  |
| Aperture |  |  | 265 |  |
| O-Ring |  |  | 267 |  |
| Housing |  |  | 269 |  |
| Threaded Ramp |  |  | 271 |  |
| Annular Piston |  |  | 273 |  |
| Annular Piston Chamber |  |  | 274 |  |
| Packing Element |  |  | 275 |  |
| Ramp |  |  | 277 |  |
| Retainer Plate |  |  | 279 |  |
| Threaded Ramp |  |  | 281 |  |
| Spring |  |  | 283 |  |
| Spring Chamber |  |  | 284 |  |
| Rubber Ring |  |  | 285 |  |
| Restricted Flow Area |  |  | 287 |  |
| Production Liner |  |  | 289 |  |
| Aperture |  |  | 291 |  |
| Cement |  | 196 |  |  |
| Geological Structure or Well Bore |  |  | 297 |  |
| Production Zone |  | 198 |  |  |
| Induced Fracture |  |  | 299 |  |
| Flow port |  |  |  | 355 |
| Seals |  |  |  | 358 |
| Flow port |  |  |  | 365 |
| Orifice |  |  |  | 371 |
| Spring |  |  |  | 372 |
| Sliding valve |  |  |  | 373 |
| Annulus |  |  |  | 374 |
| Spring |  |  |  | 375 |
| Orifice |  |  |  | 376 |
| Locking taper |  |  |  | 377 |
| Metal expandable coil spring |  |  |  | 378 |
| Metal expandable coil spring |  |  |  | 379 |
| Polymer element |  |  |  | 381 |
| Polymer element |  |  |  | 382 |
| Annular velocity valve |  |  |  | 383 |
| Flow port |  |  |  | 385 |
| Snap ring |  |  |  | 386 |
| Snap ring |  |  |  | 387 |
| Production Liner |  |  |  | 389 |
| Aperture |  |  |  | 391 |
| Well bore |  |  |  | 397 |

TABLE 1-continued

| | FIG. 1 | FIG. 2 | FIGS. 3A, 3B, and 3C | FIG. 4 |
|---|---|---|---|---|
| Orifice | | | | 411 |
| Spring | | | | 412 |
| Sliding sleeve | | | | 413 |
| Snap ring | | | | 415 |
| Spring | | | | 416 |
| Orifice | | | | 417 |
| Snap ring | | | | 418 |
| Annulus | | | | 419 |
| Seal | | | | 421 |
| Seal | | | | 422 |
| Orifice | | | | 423 |

DETAILED DESCRIPTION

The present disclosure relates, according to some embodiments, to apparatus, systems, and methods of fracturing a geological structure including the application of kinetic energy (e.g., from high velocity frack fluid) to a subterranean structure. In some embodiments, the present disclosure relates to apparatus, systems, and methods for delivery of high velocity fluid to a well using a down hole valve and/or throttling system. The present disclosure relates to apparatus, systems, and methods of generating pressure using accumulators (e.g., high pressure accumulators) at the surface of a well.

In some embodiments, fracturing a formation may include application of a kinetic energy pulse to a formation. Repeated application of such pulses may have an effect that may be likened to the effect of a jackhammer. This effect coupled with the capacity to deliver energy pulses may (e.g., very high energy pulses) lead to formation of fractures in structures that are otherwise resistant to fracturing. Some embodiments of the present disclosure may be useful for reviving wells previously closed and/or initiating production from formations previously deemed unavailable with existing technology.

The present disclosure relates, in some embodiments, to methods, apparatuses, and systems for accessing and/or producing natural gas and/or other products from a subterranean source location. For example, a well bore may be provided and/or formed, the well bore having any desired depth. For example, a well bore may be from about 500 feet to about 35,000 feet. Shallower well bores (e.g., 500'-5,000') may be useful for production of water. Deeper well bores (e.g., 5,000'-35,000') may be useful for natural gas production.

Some wells (e.g., wells in North Dakota) have may be 10,000 feet deep and have horizontal laterals with as many as 38 stages. Without limiting any embodiment of the disclosure to any particular mechanism of action, fracking sand under the force gravity may settle, for example, in one or more lower sections of one or more laterals. If this occurs, subsequent flow may be hindered due to a parasitic pressure drop resulting from friction between the drilling fluid settled frack sand. Settling may go undetected, for example, where a drilling rig, upon completion of drilling, is replaced with a small work over or coil tubing rig for fracturing. Thereafter, when fracturing is complete, a small coil or work over rig is brought in to clean out the well. These cleaning units may have (e.g., often have) a small pump capacity and may not be capable of producing the flow velocity and volume for turbulent flow capable of removing sand still in lower sections of the frack string or fracking string. When the string is removed, any sand in a horizontal section would be expected to be deposited at the end of the adjacent vertical section of the well. The presence of sand in these vertical sections may not be detected unless the well is later worked over. The present disclosure relates, in some embodiments, to methods, apparatuses, and systems that may reduce or prevent such sedimentation and/or clear settled fracking solids, if any, from down hole locations.

Preparation

After drilling a well, a subterranean formation may be prepared for production by fracturing the formation using one or more apparatus, systems, and methods disclosed herein. Preparation may include installing a production liner and fixing (e.g., cementing) the liner in place. A wellbore and a production casing may be perforated in the desired production stage (e.g., prior to fracturing). For example, a predetermined number of shots or shape charges may be loaded into a perforating gun that is then lowered or pumped into the hole to the desired location. The charges are fired and communication with the formation is established in that stage. Preparation may include installing a sliding sleeve production liner that is not cemented into place. A sliding sleeve liner may be selectively opened allowing long sections of open hole to be exposed to high fracturing pressures. Swellable permanent packers on the liner sleeve outer diameter isolate the fracture zone and allow the fracture fluid and proppant to seek the path of least resistance in areas of natural fractures or permeable sandy shale deposition.

In addition to a production liner, a working string may be installed in the wellbore inside of the liner. In some embodiments, a 2⅞" working string may be inserted in a 5½" casing or a 4½" working string may be inserted in a 7" casing. A work string may be inserted through the length of a lateral section if production is from a horizontal zone. According to some embodiments, available swell packers or sliding sleeve assemblies may be used to isolate each fracture stage.

Fracking

The present disclosure relates, in some embodiments, to apparatus, systems, and methods for fracturing geological formations in which available energy (e.g., energy identified in the general energy equation below) is applied to a formation. Energy may be applied to a formation, for example, with embodiments of disclosed apparatus and/or systems.

General energy applied to formation hydraulic fracturing may be expressed as follows:

$$PE_{IN}+KE_{IN}+FW_{IN}+U_{IN}+Q_1=PE_{OUT}+KE_{OUT}+FW_{OUT}+U_{OUT}+Q_{OUT}+W \quad (I),$$

where,
  PE=potential energy,
  KE=kinetic energy,
  FW=flow work,
  U=internal energy,
  Q=heat energy,
  W<0 is work done on the fluid,
  W>0 is work done by the fluid,
  IN (subscript)=input, and
  OUT (subscript)=output.
Flow work (FW) may be expressed as the product of fluid pressure multiplied by flow volume. Flow work (FW) may be expressed as the product of pressure multiplied by area multiplied by flow velocity.

Energy components in the general energy equation that store energy in the fracture fluid product are Potential Energy (PE), Flow Work Energy components in the general energy equation that store energy in the fracture fluid product are Potential Energy, Flow Work, Kinetic Energy, and Internal Energy. The internal energy term "U" is the energy available due to the molecular activity in the product and is primarily kinetic energy within the molecule. Gas when highly compressed stores pressure that can be available as an energy source in the formation fracture procedure and the use of this energy component as previously described is a major claim of this invention. (FW), Kinetic Energy (KE), and Internal Energy (U). Internal energy is a measure of the energy available due to the molecular activity in the product and is primarily kinetic energy within the molecule. Highly compressed gas may store pressure that may be available as an energy source in the formation fracture procedure. Internal Energy (U) may not be available in fracking processes that use incompressible fluids.

After dropping out the terms not applicable in the non-flow pressure build up in the pre-fracturing phase, the general energy equation may take the form of: Q=U+W or in differential form: dQ=dU+dW. The energy component Q is heat energy either added to or subtracted from the fluid. Q may have limited relevance to some embodiments of the disclosure. For example, Q may be limited to embodiments in which friction heat is dissipated.

Without limiting any particular embodiment to any particular mechanism of action, a primary consideration concerning rock failure is the stress applied through a pressure force, for example, without consideration of formation brittleness, ductility, and deposition. Generally, rock failure may be achieved when the pressure is great enough to exceed the rock's failure strength. According to some embodiments, kinetic energy available to act on an (isolated) hydrocarbon-bearing formation may be expressed as follows:

$$KE_t = \frac{FFM}{2g} * (FV)^2, \qquad \text{(II)}$$

where,
KE$_t$=total kinetic energy,
FFM=total mass of the fracture fluid inside the working string,
g=gravity constant, and
FV=fluid velocity.

In some embodiments, potential energy (PE) may be the hydrostatic pressure at the true vertical depth (TVD) expressed as follows:

$$\text{Pressure (psi)} = TVD(\text{ft}) * FFD(\text{lbs/ft}^3) * 1 \text{ ft}/144 \text{ in}^2 \qquad \text{(III)},$$

where,
FFD=frack fluid density.
A flow work component prior to formation breakdown (e.g., static flow conditions) may be stored in the internal energy component (U). After formation breakdown (e.g., dynamic conditions), the flow work component may be expressed as follows:

$$FW = (P_S + P_{HH} - P_F) * FA * FV \qquad \text{(IV)},$$

where,
$P_S$=surface pressure,
$P_{HH}$=hydrostatic head,
$P_F$=formation pressure,
FA=flow area, and
FV=flow velocity.

Pressure and Volume are finite values in non-flow processes. For example, the PV term is not shown in the differential equation, dQ=dU+dW, because the potential energy of a fluid at rest does not include any potential energy from pressure, which is what the PV term represents—the potential energy of a fluid at rest is equal to its internal energy (U). These conditions may exist, for example, during a high pressure build up phase, before formation breakdown and after the velocity valve has closed. A compressed gas component during this phase may have a kinetic energy component (e.g., a very large energy component) stored as internal energy available for use in the flow work energy phase after formation breakdown.

According to some embodiments, an internal work string frack fluid column may be allowed to accelerate (e.g., to maximum velocity due to an applied surface pressure force from the surface accumulators). Flow back to the surface may be terminated at maximum velocity by a down the hole event controlled annulus valve positioned on the upstream side of an active fracture stage and on the outside diameter of the work string. In some embodiments, a valve may be activated at a pre-determined frack fluid flow velocity. A valve may seal off flow between the work string and the production casing.

In some embodiments, kinetic energy in accelerated (or moving) frack fluid may be converted to a pressure generally in accordance with Newton's law (e.g., unit force=mass times deceleration). Surface pressure to accelerate a fluid column may be instantly or substantially instantly available to be superimposed on a kinetic energy pressure pulse and, thereby, increase (e.g., significantly increase) formation fracture pressure.

According to some embodiments, a frack fluid may be accelerated in a working string to any desired velocity up to any applicable physical limits. For example, a fracking fluid may be accelerated to a velocity of up to 150 feet per second (fps), from about 10 to about 60 fps, from about 25 to about 75 fps, from about 40 to about 90 fps, from about 50 to about 100 fps, from about 75 to about 120 fps, and/or from about 100 to about 150 fps. As velocity increases, heat (e.g., friction) may increase. Heat may impact fracking fluid viscosity and, accordingly, may be welcomed, controlled, or avoided, as desired or required.

As a simple illustration, according to the preceding formulae, if a fracture fluid with a density of 11 lbs/gallon is accelerated to 66 feet per second in a working string having an inside diameter of 4 inches to a true vertical depth is 8,000 FT and then abruptly (e.g., substantially instantaneously) decelerated, the kinetic energy pulse delivered (e.g., to the formation) would be 3,883,424 ft lbs during a finite time period. An isolated and exposed formation (e.g., exposed after production casing perforation or by opening an available sliding casing valve) would be subjected to this energy and, according to Newton's law, the deceleration will result in a unit pressure force acting for a short time period and can be expressed as F(psi)=mass times deceleration. If normal formation pressure at 8000 feet is 3578 psi, there would be a pressure gradient across the exposed and isolated well bore face starting at a high value (conversion of kinetic energy to unit pressure) and decreasing to formation pressure at some distance back from the well bore surface. If the pressure differential across the rock face is greater than the fracture strength of the formation, fractures will occur and the frack fluid flow state changes from static to dynamic. In some embodiments, gas and frack fluid accumulators on the surface, having been pressured up to 8000 to 10000 psi, may supply the energy to accelerate the fluid mass inside of the work string. Gas and fluid accumulators may be configured to deliver constant pressure variable volume flow so when formation fracture occurs and the frack fluid state changes form static to dynamic the computer controlled throttling valves supply the increased volume of fluid required to fill the fracture, but maintain the pressure at a preset value.

Rapid deceleration of a large high velocity fluid mass may result in a large pressure force that is the product of the mass times the velocity squared. The resulting force may create a pressure exceeding (e.g., greatly exceeding) the pressure required to initiate fracture propagation in that fracture stage. The kinetic energy component in the general energy equation would now be available. This component is not available in conventional fracturing techniques and is the only energy component that is nonlinear as it varies as the velocity to the squared power.

Existing hydraulic fracking may be performed as a constant volume, variable pressure, non-flow process as the working fracture fluid can be considered as incompressible. The pressure quickly builds up and, at some pressure, the yield strength of the rock matrix and or bond between bedding planes is exceeded and the process then changes to a more or less steady-flow process. The only energy component in the general energy equation being utilized at this time in conventional fracking is the FLOW WORK, or pressure times flow volume. The work component generated by the flow work must produce a force sufficient to fracture the rock matrix and move a mass of proppant into the fractures thereby fulfilling the work definition of force times distance and equating Flow Work=Work output.

In some embodiments, it may be desired and/or required for formation fracture pressure to be greater than the gravity force of the overburden for hydraulic fracturing to occur. For example, using a specific gravity of 2.5 for overburden rock and 8000 feet True Vertical Depth, the pressure required to equalize the overburden force would be 8666 PSI assuming pore pressure and TVD hydrostatic head are equal.

According to some embodiments, a fracking fluid may be formulated to include any desired proportion of a gas (e.g., an inert gas, $CO_2$, $N_2$, $CH_4$). For example, a fracking fluid may comprise up to about 5% (V/V), up to about 10% (V/V), up to about 15% (V/V), up to about 20% (V/V), up to about 25% (V/V), up to about 30% (V/V), up to about 35% (V/V), and/or up to about 40% (V/V) gas. In some embodiments, the percentage of gas may be selected to tune balance peak pulse pressure and pulse duration. For example, a fluid column containing 30% (V/V) $CO_2$ and 70% (V/V) frack fluid may require additional time to decelerate due to gas compression. In some embodiments, dampening of peak pulse pressure due to higher concentrations of gas may be desired to secure a longer pulse duration during the static flow state.

According to some embodiments, gas injection may form a separate part of a fluid column. For example, a gas may not be inverted nor cut with a higher specific gravity fluid. Gas may be injected in slugs and/or metered in at the same time as the frack fluid by throttling inlet valves. In some embodiments, using orifices to establish pressure controls and create a sustained harmonic motion machine optionally may be omitted (e.g., where the pressure drop across an orifice is limited by the orifice diameter, fluid mass, and flow rate). A relatively large volume gas slug flowing into a fractured formation because of less resistance to flow as compared to water, could see a pressure drop across the orifices that would allow spring 283 to open the velocity valve and initiate the kinetic energy cycle again.

Accumulators and Pumps

Hydraulic fracturing of hydrocarbon bearing geological formations may benefit from and/or require the use of multiple high pressure, high volume pumps that are connected in parallel to a common discharge line. This line leads to the wellbore and eventually the wellbore enters the production zone. Pumps used in this way may produce about 1500 to about 2000 horsepower and, when operated in parallel, may produce a total of 30000 HP available (e.g., 15 pumps×2000 HP each). Additional pumps may be on location as replacements if any active pumps fail. Because abrasive frack fluid components pass through at extremely high pressures, maintenance costs may extremely high and breakdowns may be frequent. In some embodiments, however, proppant may be delivered to a well downstream of a pressure accumulator. Such delivery may alleviate wear and tear associated with the presence of proppant in earlier stages of frack fluid production pressurization.

In some embodiments, using kinetic energy may comprise accelerating a mass of fracture produce inside a fracture fluid working string to a desired velocity (e.g., a maximum velocity within the limits of the friction pressure loss) and decelerating this mass by rapidly (and optionally, reversibly) closing a downhole annular valve. A downhole annular valve may encircle a working string and be positioned adjacent to and upstream of a hole connecting the working string interior channel with the liner channel. Rapid deceleration of a frack product may create a large pressure pulse or surge that (e.g., an extremely large pressure pulse or surge) is the product of a flow work energy component super imposed on the kinetic energy component immediately followed by the continued flow work energy component. This pulse may be applied to exposed production formation. The flow work energy component may be produced by a system as shown in FIG. 1.

In some embodiments, surface accumulators may discharge fracture fluid from a bank of pre-charged accumulators at about 8000 to about 10000 psi. Accumulators may be charged with any desired gas including, for example, $CH_4$, $N_2$, $CO_2$, any inert gas, or combinations thereof. A fluid accumulator may contain a floating piston that separates the gas side from the frack fluid side and discharge to a common work string flow line. Discharge from a bank of accumulator's that have been pre-charged with $CO_2$, $CH_4$, or some other desirable injection gas at an initial pressure of 8000 to 10000 psi may also discharge to a flow line through metering valves. A flow line may be inserted to the beginning of the fracture stage.

The desired percentage mixture of fluid and gas, as computer controlled by high pressure metering valves, may enter a high pressure discharge line. Fluid delivery from this system may be volume demand driven at a pre-determined constant pressure. A torque convertor electric motor driven conventional frack pump will have a delayed response, for example, about 6.66 seconds round trip in a 16000 foot well, to an increase in down the hole volume requirement as fracturing develops due to the time delay of the pressure decrease as a function of the velocity up the fluid stream to the pump discharge and back down to the formation.

High pressure bulk containers may inject the calculated flow rate of proppant into a flow stream and upstream from a fracture fluid pipe string connection. This procedure eliminates abrasive proppants passing through an accumulator, make up frack pumps, and computer controlled valves in the system prior to the bulk storage valves. Circulation is down through the work string and out the end near the beginning of the fracture stage; then back up the annulus between the last inserted casing string and the work string and out the well head annulus valve to the mixing tank or waste pit. At maximum velocity and after event-controlled closure of an annular valve just upstream from the active fracture stage, and flow may be stopped from the annulus kill line valve at the surface well head.

Additional gas and fracture fluid accumulators may come on line to instantly supplement the kinetic energy pressure surge and deliver additional flow work component from the general equation where the process operates in a constant-flow mode as formation fracturing occurs. The volume of gas now in the working string and annulus acts as an energy storage medium and the pressure content and volume content of the internal energy (U) are available to add to the Flow Work component at formation breakdown thereby increasing the work output applied to formation fracturing and proppant wedging into the fractures. According to some embodiments, a predominant component of this kinetic energy event is the pressure surge and when almost instantly followed by a constant pressure variable volume Flow Work energy component produced by the surface accumulators, this compound energy application to the producing formation may improve (e.g., significantly improve) fracture propagation and/or increase (e.g., significantly increase) production.

Brittleness, absence of ductility, and/or deposition conditions (sand content etc.) may influence and/or determine the failure stress value, but failure will occur at some upper level. The greater the pressure differential across the perforations and rock face during the initial fracture, the greater the extent of the fracturing, according to some embodiments. Energy applied from the kinetic energy surge and almost instant follow up from the accumulators may greatly extend the initial fractures. The unit pressure force necessary to hold open the fractures after failure and allow proppants to be displaced into the fracture void is less than that necessary to exceed the formation yield strength because the formation has failed.

In some embodiments, the percentage of gas volume in the fracture fluid may be equivalent to that volume of water that is eliminated. The very large volume of fresh water that is now required in conventional fracturing is causing alarm due to environmental concerns for waste water disposal and high water usage. For example, a series of fourteen horizontal wells drilled by QEP in the Bakken required 1,116, 536 bbl. of water and 45,409,000 pounds of proppant. The water required would have filled a 15 acre lake 10 feet deep. The use of 50% $CO_2$ or NG (natural gas) in these wells would have eliminated 50% of the required water. In some embodiments, less water may be required using apparatus, systems, and methods in accordance with this disclosure. A reduction in the amount of water needed may be attributable to increased efficiency of fracking even if gas is not a component of the mixture.

Hydraulic Horsepower is the product of pressure and volume and both of these components form a linear relationship to the HP equation. For example if 10,000 HHP are available and it is determined that a surface pressure of 8000 psi is desired for formation breakdown and formation pressure is the same as the hydrostatic fracture fluid column pressure, then these may offset each other and the 8000 psi may be available to fracture the formation. Volume output with 10000 HP available and a discharge pressure of 8000 psi would be 2142.5 gpm. The pressure component applies the unit force necessary to cause a stress in the formation matrix that is greater than the ultimate failure strength and is responsible for the fracture propagation. In some embodiments, this may be important (e.g., the most important) constituent initiating formation fracture. The volume component fills the fracture volume with fracture fluid and proppant and then acts as a structural member to keep the fracture open. Fracture propagation may continue as long as the pressure exceeds the rock fracture strength but as the fractures increase in length and quantity, the friction pressure loss and volume requirements are increased thereby requiring a greater pressure and volume. Normal formation pressure at a TVD of 8000' is 3577 psi using 8.4 pound per gallon salt water. Normal fracture fluid weight is 10 to 12 pounds per gallon. Using 12 lbs/gallon fluid would give an 8000' bottom of the hole pressure of 4986 psi. The formation pressure to bottom hole pressure differential would be −1409 psi. If a pressure of 8000 psi is required to cause formation breakdown then the surface pressure would need to be over 6600 psi.

According to some embodiments, a well head may be connected with automatic computer-controlled valves to accumulators for injecting metered volumes of $CO_2$, natural gas, or other gasses and fracture fluid. A manifold may be included to connect frack pumps. High pressure containers for proppant and/or weighting materials injection may be included in an apparatus and/or may be installed between an accumulator/pump output manifold and a well head. Injection of fracture fluid and gas in a predetermined ratio may provide a fluid column compressibility and the internal energy component may become very significant.

In some embodiments, a system may comprise a high-pressure gas accumulator for pressurizing fluid (e.g., drilling fluid) to be delivered to a down hole site. A gas accumulator may comprise, for example, one or more cylinders (e.g., 30-inch diameter), each capped on one end and manifolded to a bank of compressors on the other end. A gas accumulator may deliver gas pressure to one side of a fluid piston connected to an orifice. Fluid pressure (e.g., drilling fluid pressure) may be delivered to another side of the fluid piston. The pressure across an orifice (e.g., a surface orifice providing access to a fracking string) may remain constant and volume of fluid flowing through the orifice may be varied by varying the gas pressure delivered using the gas accumulator and/or a flow throttle.

Apparatus and Systems

The present disclosure relates, in some embodiments, to kinetic fracking apparatus and systems in which the kinetic energy of a fluid in motion is applied to a geological structure to promote formation of fractures in the structure. A kinetic fracking system may comprise, for example, a fracking string having a central channel and a central channel axis, a generally concentric fluid velocity activated annular valve axially slidable and comprising a ramp, a generally concentric packing element in communication with the ramp and configured for radially outward translation upon axial movement of the ramp, and/or a generally concentric spring in communication with the valve and configured to be compressed by axial movement of the valve. A valve ramp may extend over the full circumference and at least a portion of the length of a valve. Its maximum extent (e.g., largest diameter) may be positioned at the more downhole end of the valve and/or its minimum extent (e.g., smallest diameter) may be positioned at the end of the valve nearer to the well head. The narrower end of a valve taper or ramp may include a fixation zone (e.g., a threaded zone) where a retainer plate may be secured. A retainer plate may restrict and/or prevent axial movement of a packing element such that the packing element is biased to move radially outwardly. A retainer plate may contact a spring and/or restrict or prevent (e.g., alone or together with a housing)

movement of a spring other than compression and expansion. A valve may be sealably attached to and/or contiguous with a generally concentric annular piston (e.g., comprising rubber and/or fabric). A piston may extend radially outwardly from a valve and occlude (e.g., substantially occlude) the cavity between a liner and a fracking string. A housing may be secured to a fracking string, for example, by mated threaded zones positioned at the well head end.

During initial stages of fracking, flow velocity may be high (e.g., extremely high) and may suffice to keep high density material in suspension. As fractures progress into a formation and propping agents are wedged into the fractures, fracture fluid pressure may be reduced or lost due to friction and/or obstruction(s) in the formation. This reduction or loss of pressure may result in a lower flow rate and, if continued, injection flow may stop. Lower flow rates may not be sufficient to keep high density material in suspension. For example, in some operations, a difference in the specific gravity of the fracking sand and fluid at low flow rates may allow gravity settling of the higher specific gravity material, which in turn, may block flow. Fracking sand and/or ceramic propping agents (e.g., having a specific gravity of 2.5 may settle out of a fracking fluid (e.g., having a specific gravity of 1.2), which may obstruct a well string bore and/or reduce the available flow work or kinetic energy available for fracturing a subterranean structure. Such obstructions, if formed, may hinder efforts to reinitiate flow and/or achieve desired flow rates.

Systems, methods, and apparatuses may, in some embodiments, be configured and/or operated to avoid sedimentation of fracking sand from a drilling fluid. A kinetic fracking system may comprise, for example, a fracking string having a central channel and a central channel axis, the central channel having a (proximal) surface end and a (distal) formation end, a generally concentric annular velocity valve including a ramp, a generally concentric annular fluid velocity-activated annular valve assembly that is axially slidable (a slider valve assembly) positioned proximal to the velocity valve, a generally concentric packing element in communication with the ramp, a generally concentric first spring in communication with the proximal end of the slider valve assembly, and/or a generally concentric second spring in communication with the distal end of the slider valve, wherein the first and second spring may be configured to be compressed by opposite axial movements of the slider valve. A slider valve may comprise and a frack string may each comprise an orifice, according to some embodiments. A slider valve hole and a frack string hole may be configured and arranged, in some embodiments, to permit, when aligned, fluid communication between the inside diameter (ID) of a frack string and the annular space between the frack string outer diameter (OD) and the production casing ID.

In some embodiments, a down hole slider valve may configured to allow their respective orifice(s) to substantially align or align when the formation stops taking frack fluid and the flow velocity approaches zero, thereby permitting fluid to move from the frack string ID to the annular space. For example, flow from the frack string to the annular space Systems, apparatus, and methods may include configuring a spring force to be responsive to differential pressure across an orifice (e.g., connecting a frack string ID and the annulus between the frack string OD and the production casing ID) such that it causes a slider valve to shuttle from an open position to a closed position as a function of frack fluid flow rate. For example, at high flow rates, the slider may have an open position. As flow rate drops, a slider may move to a closed position. At (or near) zero flow the spring force may cause the valve to move to an open position and allow flow from the frack string inner diameter to the annulus to resume. Resuming flow may include accelerating a frack fluid mass inside of the frack string to a velocity (e.g., a desired velocity, a maximum velocity). In some embodiments, resuming flow may again initiate a kinetic energy event. Each successive kinetic event may allow any sand or ceramic bead accumulation in the frack string to be flushed to the annulus, thereby reducing and/or clearing any blockage that might otherwise hinder flow and formation fracturing. At high (e.g., maximum) flow, differential pressure across a flow orifice to the annulus may cause the valve to return to the closed position as a compression spring is compressed from the differential pressure force and a valve mandrel slides to the closed position.

Specific Example Embodiments

Specific example embodiments of a fracking system are illustrated in FIG. 1. As shown, gas in high pressure accumulator 104 and/or the gas side of accumulator 114 may be pressurized by high pressure gas compressor 106 connected via high pressure gas supply line 108. Gas may be admitted to high pressure accumulator 104 by high pressure gas input valve 110. High pressure gas accumulator 104 is in communication with well head 142 and may deliver gas under the control of programmed gas throttling valve 102.

Fluid may be mixed with gas in high pressure accumulator 114. Gas is admitted from high pressure gas compressor 106 by high pressure gas inlet valve 112 and contacted with fluid in fluid side 118 by the action of piston 116. Program controlled fluid bypass valve 128 may admit metered portions of gas/fluid mixture from accumulator 114 to pump bypass line back to suction 126 where it is conveyed to high pressure frack pump 122. The mixture may then be returned to accumulator 114 with any needed additions of make-up fluid added by fluid accumulator make up line 124. Gas side high pressure gas accumulator 114 is in communication with well head 142 and may deliver gas/fluid there under the control of programmed throttling valve 120. As FIG. 1 illustrates, dopant may be added to the gas/fluid mixture exiting accumulator 114 to form frack fluid containing proppants 134 as shown using one or more dry dopant dispensers 130 regulated by program controlled metering valve 132. Thus, fluid 134 and gas 136 combine to deliver fluid at high velocity to well head 142 and production string 144 positioned inside of production liner 138. Movement of the combined fluid may be abruptly stopped downhole by the action of a fluid velocity activated annular valve 146 or a pressure activated packer 148. This may result in the delivery of a high energy pulse at production zone 198.

Valve 140 may be installed on all wells. As show, valve 140 may be attached to the wellhead and may give access to the annulus between the inside diameter of the production string and the internal tubing string or drill pipe while the well is being drilled. Valve 140 may be used as a choke line valve in the prevention of a well blowout by holding a back pressure on a formation. Any gas that has not been injected into the formation and is displaced up the annulus may start to expand with each increment up the hole and, thereby, reduce the hydrostatic head on the formation. In some embodiments, a computer program may be configured (e.g., programmed) to maintain a constant discharge pressure at the well head by throttling the valve.

Specific example embodiments of a fluid velocity activated annular valve system are illustrated in FIGS. 2A, 2B, and 2C. As shown, production liner 289 having spaced apertures 291 is positioned in well bore 297. In operation, high velocity frack fluid flows (open arrow) down the inside diameter of frack string 251. It enters the annular space between string 251 and liner 289 through apertures 255 and 265. In some embodiments, frack string 251 may include a dead end to the right of the portion shown in FIG. 2A. Fluid passes through restricted flow area 287 between housing 269 and liner 289. The high velocity frack fluid sees a pressure drop through the restriction so that P1 is greater than P2. Annular sliding valve body 259 may encircle interior channel wall 253 of string 251. A seal may be formed between string 251 and velocity valve 259 by O-rings 267 positioned between the two and at either end of valve 259. Annular valve 259 may be fixed to annular (flared) rubber and fabric piston 285. Piston 285 may include a surface facing (proximal to) aperture 265 and a surface facing away from (distal to) aperture 265.

When the pressure acting on the proximal surface (e.g., P1) exceeds the sum of the pressure acting on the distal surface (e.g., P2) plus the spring constant of spring 283, valve 259 moves to the left (closed arrows). As valve 259 moves to the left, spring 283 (housed in chamber 284) is compressed. Translation of valve 259 abruptly stops flow of fracking fluid because ramp 277 of packing element 275 slides across ramp 261 of valve 259 moving packing element 275 radially outwardly to form a seal with string 289. At this time frack fluid flow back to the surface is terminated and the entire mass of frack fluid inside the work string is abruptly decelerated creating a large kinetic energy component. A period of static flow conditions occur. Surface gas and fluid accumulators may now supply maximum design pressure to the production formation that has been exposed through casing ports 291.

Annular piston chamber 274 is in fluid communication with spring chamber 284. Piston chamber 274 may be sized to correspond in volume to spring chamber 284 or sized to correspond to the volume of the spring chamber displaced by ring 279/valve 259 during a stroke. Piston 273 may be allowed to free float within chamber 274. When piston 273 is displaced to the right, frack fluid may occupy chamber 274. As retainer ring 279 compresses spring 283 the, fluid (e.g., high viscosity/high temperature grease) flows out of spring chamber 284 and enters chamber 274 driving piston 273 leftward and displacing frack fluid (if any). Frack fluid may be permitted to enter and exit the void shown in FIG. 2B defined by velocity valve 259, collar 269, packing element 275, and retaining ring 279 during each stroke. In some embodiments, measures may be taken to reduce or prevent infiltration of frack fluid into chamber 284. For example, ring 279 may be fitted with one or more seals (e.g., O-rings on its outer diameter).

Flow conditions change from static to dynamitic at formation breakdown (e.g., formation of fractures 299). Assuming sufficient accumulator volume capacity combined with pump and compressor make up feed, a constant pressure variable demand volume flow condition will occur so that fracture propagation and proppant placement will proceed on a continuous basis until such time as the pressure drop through the fracture zone exceeds that necessary to cause further formation failure. At this time flow into the hole will stop at full pressure. If there is no pressure bleed down closing off the accumulator valves and venting the frack fluid, P1 and P2 will equilibrate and work string will reset the fluid velocity valve to open (shifted to the right as shown in FIG. 2A) as the only force acting will be compression spring 283. Piston 273 and fluid in chamber 274 will correspondingly move rightward. As desired, this action may allow another pulse sequence to be initiated.

Valve 259, as shown, includes a uniform inner diameter mated to the outer diameter of wall 253. Valve 259 also includes threaded zone 263, which is matched to threads 281 of retainer plate 279. Retainer plate 279 cooperates with ramp 261 to generate radially outward travel of packing element 275. Threads 271 of housing are secured to threads 259 of fracking string 251. Valve 259 may comprise steel compression molded with a combination of extremely high strength fabric such as Dacron and a high strength polymer such as polyurethane. The first coil of spring 283, pressing against retainer plate 279 is machined to act as a back up to the polymer as a differential pressure of 8000 to 10000 psi may occur between the retainer plate and the packing element.

As shown in FIG. 2C, velocity valve 259 comprises generally tubular body 260 having proximal taper 261, neck 262, threads 263, flange 264, apertures 265, and distal neck 266. Proximal neck 262 and distal neck 266 may have the same or substantially the same outer diameter. The length of taper 261, neck 262, threads 263, flange 264, apertures 265, and 266 may be independently varied as desired or required. The position, size, shape, and/or number apertures 265 independently may be varied. In some embodiments, the position, size and number are selected according to the position, size, and number of apertures 255. For example, apertures may be aligned at the beginning of a cycle and closed (not aligned) in the middle of a cycle. Apertures may be configured to permit flow throughout a cycle, even if fluid isn't actually flowing. The position of threads 263 on taper 261 and the angle of taper 261 independently may be varied as desired or required, the length and taper position of apertures 265 along neck 266 may be varied as desired or required. The inner surface of body 260 may be uniform, substantially uniform, or contoured (e.g., to accommodate a seal). Although not expressly shown, valve 259, housing 269, retainer 279 and/or any other members that slide or house a sliding member and/or any subparts thereof may have one or more inner diameter and/or outer diameter surface features to restrict and/or prevent rotation.

Valve 259, if installed in the correct position in a casing annulus might mitigate or prevent blowouts by sealing off high pressure downhole to surface flow. Although string 251 and valve 259 are depicted in a horizontal orientation in FIGS. 2A and 2B, they may be positioned at any desirable angle desired or required by downhole conditions.

Specific example embodiments of a fluid velocity activated annular valve system are illustrated in FIG. 3A, FIG. 3B, and FIG. 3C. As shown in FIG. 3A, production liner 389 having spaced apertures 391 is positioned in well bore 397. In operation, high velocity frack fluid flows down the inside diameter of frack string 351. In some embodiments, frack string 351 may include a dead end to the right of the portion shown in FIG. 3A. There is a pressure drop across orifice 371 (P3) as long as fluid flows through the inside diameter of frack string 351. A flow port 385 associated with frack string 351 is also shown in FIG. 3A. Over of time, fluid flow through the inside diameter of frack string 351 may be reduced, for example, as the subterranean structure fills with fluid and/or resists further breakdown. As this fluid flow is reduced, the pressure drop across orifice 371 is also reduced. This pressure drop serves as a balancing pressure against spring 372. When the pressure drop falls below a desired, defined, and/or preset threshold, spring 372 overrides the reduced pressure drop across orifice 371, thereby allowing the sliding valve 373 to move horizontally and align (and open) ports 355, 365 to the annulus 374. The sliding valve 373, along with any of the other elements illustrated in FIGS. 3A, 3B, and 3C may be coupled to and associated with one or more seals 358. Opening the ports 355, 365 causes fluid to flow through from the frack string 351 to the annulus 374. Fluid is then free to flow to the annulus 374 (which may extend to or be in fluid communication with the surface), allowing the full column of the frack fluid to accelerate (back) to its maximal or desired rate and initiation of a kinetic energy event (e.g., an additional kinetic energy event). Therefore, in some embodiments, as the flow rate decreases, the differential pressure between P1 and P3 decreases, thereby causing the sliding valve 373 to move toward the left.

Opening the ports 355, 365 causes at least a portion of the annulus 374 to act as an orifice. The orifice associated with the annulus 374 is designed to produce a pressure drop at maximum fluid flow so that the combined differential pressure drop force across the orifice associated with the annulus 374 and orifice 371 combined with spring 375's compression causes the sliding valve 373 to close off flow to annulus 374. Spring 375 and spring 372 are offset by forces created by pressure drops across the orifice associated with the annulus 374 and orifice 371, respectively. In some embodiments, spring 375 is offset by force created by a pressure drop across orifice 376 (P2), rather than, or in combination with, a pressure drop across the orifice associated with the annulus 374. While snap rings 386, 387 are illustrated in FIG. 3A, the functionality of the snap rings 386, 387 is explained in further detail in FIG. 4. In some embodiments, any of the orifices described herein may be controlled using a computer-controlled device. The structure and functionality of FIG. 3A is primarily described with respect to the upper part of the fluid velocity activated annular valve system. The lower part of the fluid velocity activated annular valve system may have similar structure and functionality as well.

FIG. 3B is a close-up version of a portion of FIG. 3A. FIG. 3B shows a locking taper 377 comprising metal expandable coil springs 378, 379 to back up piston rubber and prevent extrusion at high pressure levels. In some example embodiments, the locking taper is less than 1.5 inches per feet. The coil springs 378, 379 are coupled to polymer elements 381, 382 (e.g., carbon fiber elements). The locking taper prevents the flow of fluid through an area locked by the locking taper. The annular velocity valve 383 is locked in place and does not move. FIG. 3C shows the system of FIG. 3A such that fluid passes through ports 355, 365, which may or may not be aligned either partially or totally, to the annulus 374. Spring 375 is compressed in FIG. 3C, while it is not compressed in FIG. 3A. Spring 372 is not compressed in FIG. 3C, while it is compressed in FIG. 3A. Therefore, FIG. 3C illustrates an annulus flow open position, while FIG. 3A illustrates an annulus flow closed position. Any orifice, aperture, or opening described in this specification may have any desired shape and size.

Specific example embodiments of a fluid velocity activated annular valve system are further illustrated in FIG. 4. In some embodiments, at full flow rate, a slider sleeve 413 may be force balanced in an annulus flow closed position such that flow is directed into a formation, but not into an annular space 419 between a fracking string and a liner. As the formation starts to resist flow, the flow rate into the formation falls and the pressure drop across orifice 411 decreases. When the pressure drop falls to and/or below a threshold level, spring 412 moves slider sleeve 413 to an annulus flow open position such that fluid is permitted to enter the annular space 419 between frack string and liner. Seals 421, 422 are coupled to and associated with the slider sleeve 413. If this flow is relatively impeded as may be desired, fluid flow rate once again increases. Sliding valve 413 may be configured to return to an annular space 419 closed position once the flow rate rises above a desired level. The formation is thus exposed to the kinetic energy of the flowing (e.g., rapidly flowing) fluid.

A decrease in pressure across orifice 411 allows spring 412 to override the pressure dropped across orifice 412 resulting in slider sleeve 413 taper exerting force on a matching taper of snap ring 415. As fluid flow nears zero, spring 412 is designed to force open snap ring 415 and compress spring 416. Slider sleeve 413 moves to the annulus open position and snap ring 415 taper engages matching slider sleeve 413 taper. Full fluid flow is now to the annulus allowing maximum acceleration of the full column of the frack fluid and reinitiation of a kinetic energy event. Orifice 417 is designed to produce a pressure drop at maximum fluid flow so that the combined differential pressure drop force across orifice 411 and orifice 417 combined with spring 416's compression force forces snap ring 418 outward and allows slider sleeve 413 to close off the annulus. In some embodiments, spring 416 is offset by force created by the pressure drop across orifice 423, rather than, or in combination with, the pressure drop across the orifice 417 going to the annular space 419.

Calculated flow rates, pressures, and forces for a specific example embodiment are shown below. Such calculations may be used, according to some embodiments, to plan, predict, and/or determine various aspects of systems illustrated and described herein. For example, the calculations show the net theoretical force from a pressure drop across an orifice (e.g., orifice 417) and the quantity of fluid required to compress a spring (e.g., spring 351). The amount of kinetic energy generated using any of the systems described herein may produce a pressure of 30000 psi in approximately 5 seconds. In the calculation below, Ft or ft stands for feet, ID stands for diameter, in stands for inches, gal stands for gallons, min stands for minutes, Wt stands for weight, psi stands for pounds per square inch, KE stands for kinetic energy, FW stands for flow work, P stands for pressure, sec stands for seconds, vel stands for velocity, in stands for inches, $CO_2$ stands for carbon dioxide, and HP stands for horsepower.

| | |
|---|---|
| Vertical depth = | 16000 Ft |
| Frack String ID = | 4 in |
| Frack String area = | 0.087222 $Ft^2$ |
| Orifice ID = | 3 in |
| Orifice area = | 0.049063 $Ft^2$ |
| Total flow rate = | 4000 gal/min |
| $CO_2$ % by vol = | 0.3%*100 |
| Frac fluid % by Vol = | 56.00 |
| Sand % by Vol = | 14.00 |
| sg sand = | 2.5 |
| sg water = | 1 |
| frack fluid #/gal = | 10 #/gal |
| sand #/gal = | 20.86 #/gal |
| Wt Co2 @8000 psi = | 0.12 #/sec |
| Weight of fluid | 373.33 #/sec |
| Weight of sand | 194.65 #/sec |
| Total Wt = | 568.11 #/Sec |
| Vel in 4" ID = | 102.18 ft/sec |
| Vel in Orifice = | 181.66 ft/sec |

-continued

| | |
|---|---|
| KE1 = | 92110 ft #/sec |
| KE2 = | 291113 ft #/sec |
| assume P1 = | 8000 psi 8000 |
| Flow = | 8.91 ft³/sec |
| FW1 = | 10267380 ft #/sec |
| (KE1 + FW1) = | KE2 + FW2 |
| FW2 = | vel2 *area2*P2 |
| | (KE1 + FW1 − KE2)/ |
| | (vel2*area2) = P2 |
| P2 = | 7845 |
| P1 − P2 | 155 #/in^2 or 22328.12 |
| Net force from differential pressure to compress spring = | 852 pounds |
| Ratios: Frac fluid and sand = | 70% by volume |
| Co2 = | 30% by volume |
| Frac fluid = | .70 times .80 Times total volume |
| Sand = | .70 Times .20 times total volume |
| Kinetic Energy = | 11847341 ft pounds/second or 21541 HP/Sec |

As will be understood by those skilled in the art who have the benefit of the instant disclosure, other equivalent or alternative kinetic fracking compositions, devices, methods, and systems can be envisioned without departing from the description contained herein. Accordingly, the manner of carrying out the disclosure as shown and described is to be construed as illustrative only.

Persons skilled in the art may make various changes in the shape, size, number, and/or arrangement of parts without departing from the scope of the instant disclosure. For example, the position and number of pumps, accumulators, valves, apertures, and controllers among others, may be varied. The size of an apparatus and/or system may be scaled to suit the needs and/or desires of a practitioner. Each disclosed method and method step may be performed in association with any other disclosed method or method step and in any order according to some embodiments. Where the verb "may" appears, it is intended to convey an optional and/or permissive condition, but its use is not intended to suggest any lack of operability unless otherwise indicated. Persons skilled in the art may make various changes in methods of preparing and using a composition, device, and/or system of the disclosure. Elements, compositions, devices, systems, methods, and method steps not recited may be included or excluded as desired or required.

Also, where ranges are provided, the disclosed endpoints may be treated as exact and/or approximations as desired or demanded by the particular embodiment. Where the endpoints are approximate, the degree of flexibility may vary in proportion to the order of magnitude of the range. For example, on one hand, a range endpoint of about 50 in the context of a range of about 5 to about 50 may include 50.5, but not 52.5 or 55 and, on the other hand, a range endpoint of about 50 in the context of a range of about 0.5 to about 50 may include 55, but not 60 or 75. In addition, it may be desirable, in some embodiments, to mix and match range endpoints. Also, in some embodiments, each figure disclosed (e.g., in one or more of the examples, tables, and/or drawings) may form the basis of a range (e.g., depicted value +/− about 10%, depicted value +/− about 50%, depicted value +/− about 100%) and/or a range endpoint. With respect to the former, a value of 50 depicted in an example, table, and/or drawing may form the basis of a range of, for example, about 45 to about 55, about 25 to about 100, and/or about 0 to about 100. Disclosed percentages are weight percentages except where indicated otherwise.

All or a portion of a kinetic fracking device and/or system may be configured and arranged to be disposable, serviceable, interchangeable, and/or replaceable. These equivalents and alternatives along with obvious changes and modifications are intended to be included within the scope of the present disclosure. Accordingly, the foregoing disclosure is intended to be illustrative, but not limiting, of the scope of the disclosure as illustrated by the appended claims.

The title, abstract, background, and headings are provided in compliance with regulations and/or for the convenience of the reader. They include no admissions as to the scope and content of prior art and no limitations applicable to all disclosed embodiments.

What is claimed is:

1. A system for kinetically fracking a subterranean structure, the system comprising:
    (a) a well in fluid communication with the subterranean structure;
    (b) a well liner disposed inside the well;
    (c) a fracking string disposed inside the well liner, the fracking string comprising a central channel; and
    (d) a fluid velocity activated annular valve with at least one aperture configured to support fluid communication between the central channel and a cavity between the liner and the fracking string, where the valve is configured to abruptly decelerate flow of a fracking fluid in a direction towards a well head and direct the fracking fluid towards the subterranean structure.

2. The system according to claim 1, further comprising from one to about twenty high pressure gas pumps, each independently configured to deliver 1500 to 2000 horsepower.

3. A downhole fluid velocity activated annular valve configured for operation in a wellbore with an inserted production liner, the valve comprising:
    (a) an annular body having a longitudinal axis, an interior surface configured to slide along a fracking string, and an exterior surface comprising a taper, the taper extending circumferentially around the exterior surface and extending along at least a portion of a length of the body;
    (b) an annular packing element contacting and surrounding the taper and configured to translate radially outwardly upon axial movement of the body; and
    (c) at least one aperture disposed in the body and configured to align with a corresponding hole in the fracking string and support fluid communication between an inner channel of the fracking string and a cavity between the liner and the fracking string.

4. The valve according to claim 3, further comprising an annular housing surrounding an annular spring, the spring is configured for compression and decompression with axial movement of the body.

5. The valve according to claim 3, further comprising an O-ring disposed on the interior surface and configured to sealably contact the fracking string.

6. The valve according to claim 3, wherein a maximum extent of the taper is positioned proximal to a more downhole end of the body, and a minimum extent of the taper is positioned proximal to an end of the body closer to a well head.

* * * * *